US011807305B2

(12) United States Patent
Fuerfanger et al.

(10) Patent No.: US 11,807,305 B2
(45) Date of Patent: Nov. 7, 2023

(54) MOTOR VEHICLE

(71) Applicant: Bayerische Motoren Werke Aktiengesellschaft, Munich (DE)

(72) Inventors: Josef Fuerfanger, Zangberg (DE); Piotr Kotlarski, Munich (DE); Gagan Saket, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 216 days.

(21) Appl. No.: 17/286,971

(22) PCT Filed: Oct. 23, 2019

(86) PCT No.: PCT/EP2019/078881
§ 371 (c)(1),
(2) Date: Apr. 20, 2021

(87) PCT Pub. No.: WO2020/083987
PCT Pub. Date: Apr. 30, 2020

(65) Prior Publication Data
US 2021/0387678 A1    Dec. 16, 2021

(30) Foreign Application Priority Data
Oct. 25, 2018  (DE) .................... 10 2018 126 598.0

(51) Int. Cl.
*B62D 25/08*   (2006.01)
*B62D 21/02*   (2006.01)
*B62D 21/11*   (2006.01)

(52) U.S. Cl.
CPC .......... *B62D 25/085* (2013.01); *B62D 21/02* (2013.01); *B62D 21/11* (2013.01); *B62D 25/088* (2013.01)

(58) Field of Classification Search
CPC ...... B62D 25/08; B62D 25/085; B62D 21/02; B62D 21/11; B62D 25/088
See application file for complete search history.

(56) References Cited

U.S. PATENT DOCUMENTS 5,031,958 A      7/1991 Fujita et al.
2005/0242625 A1  11/2005 Hafner et al.
(Continued)

FOREIGN PATENT DOCUMENTS

CN    201472477 U      5/2010
CN    103129620 A   *  6/2013   ............. B62D 21/11
(Continued)

OTHER PUBLICATIONS

English-language translation of Chinese-language Office Action issued in Chinese Application No. 201980069426.3 dated Sep. 2, 2022 (nine (9) pages).
(Continued)

Primary Examiner — Lori Lyjak
(74) Attorney, Agent, or Firm — Crowell & Moring LLP

(57) ABSTRACT

A motor vehicle has a front-end vehicle structure which has a wheelhouse support structure on each side of the front-end vehicle structure, in each of which wheelhouse support structure a bearer extends from an A-column to an engine support via a suspension strut receptacle. An engine support is formed beneath each wheelhouse support structure. The front supporting bearer extends in a vertical plane in an arc from the suspension strut receptacle downwards to the engine support. The front supporting bearer extends in a horizontal plane in an arc from the suspension strut receptacle from the outside inwards in the direction of a longitudinal axis of symmetry through an angle to the engine support, and the front supporting bearer is fastened with the front end thereof to the engine support.

14 Claims, 3 Drawing Sheets

(56) References Cited

U.S. PATENT DOCUMENTS

| | | |
|---|---|---|
| 2009/0315364 A1 | 12/2009 | Stojkovic et al. |
| 2015/0360724 A1 | 12/2015 | Grueneklee et al. |
| 2018/0170440 A1 | 6/2018 | Watanabe et al. |

FOREIGN PATENT DOCUMENTS

| | | | | |
|---|---|---|---|---|
| CN | 104015803 A | * | 9/2014 | ............. B62D 21/11 |
| CN | 105073560 A | * | 11/2015 | ............. B60K 11/04 |
| CN | 105905169 A | * | 8/2016 | ........... B62D 25/082 |
| DE | 40 08 896 A1 | | 9/1990 | |
| DE | 100 18 179 A1 | | 10/2001 | |
| DE | 10 249 115 A1 | | 11/2004 | |
| DE | 10 2014 008 402 A1 | | 12/2015 | |
| JP | 2004-306803 A | | 11/2004 | |
| JP | 2009-248805 A | | 10/2009 | |
| JP | 2010-120533 A | | 6/2010 | |
| WO | WO 2004/037629 A1 | | 5/2004 | |

OTHER PUBLICATIONS

International Search Report (PCT/ISA/210) issued in PCT Application No. PCT/EP2019/078881 dated Jan. 27, 2020 with English translation (six (6) pages).

Japanese-language Written Opinion (PCT/ISA/237) issued in PCT Application No. PCT/EP2019/078881 dated Jan. 27, 2020 (nine (9) pages).

German-language Search Report issued in German Application No. 10 2018 126 598.0 dated Jul. 30, 2019 with partial English translation (11 pages).

* cited by examiner

MOTOR VEHICLE

BACKGROUND AND SUMMARY OF THE INVENTION

The invention relates to a motor vehicle having a front carriage structure which has a wheel house carrier structure at both sides, wherein the respective wheel house carrier structure is connected in each case to a motor carrier and to a respective front body pillar. The respective wheel house carrier structure has a front support carrier, a suspension strut receiving member, a rear support carrier which extends obliquely downward and a rear, upper support carrier which are in each case secured to the front body pillar.

DE 10249115 A1 discloses a motor vehicle in which two motor carriers which extend parallel with each other and which are spaced apart from each other are constructed. The front carriage structure has a carrier which extends from an A-pillar or front body pillar via a suspension strut receiving member and which finally terminates on a motor carrier at an acute angle, that is to say, at an angle less than 90°, and is secured to the motor carrier.

An object of the invention is to provide a motor vehicle in which the rigidity of a front carriage structure is increased.

This object is achieved by the features of the independent claim.

A motor vehicle according to the invention is provided with a front carriage structure which has a wheel house carrier structure at both sides. The respective wheel house carrier structure is connected in each case to a motor carrier. The respective wheel house carrier structure is arranged in each case on a respective front body pillar. The respective wheel house carrier structure has a front support carrier, a suspension strut receiving member, a rear support carrier which extends obliquely downward and a rear, upper support carrier, respectively. The respective rear support carrier which extends obliquely downward and the respective rear, upper support carrier are in each case secured to the front body pillar.

Advantageously, the respective front support carrier extends in a vertical plane in a curve downward from the respective suspension strut receiving member in the direction toward the respective motor carrier. The respective front support carrier advantageously extends in a horizontal plane in a curve from the respective suspension strut receiving member from the exterior inward in the direction of a longitudinal axis of symmetry through an angle ß in the direction toward the respective motor carrier. The respective front support carrier is secured to the respective motor carrier with the respective front end thereof. As a result of the curved path of the respective front support carrier in the vertical plane and the horizontal plane, a continuous force path is achieved. The angle ß is advantageously ß=35°±5°.

The respective rear, upper substantially horizontally extending support carrier preferably extends in a horizontal plane from the front end thereof up to the rear end thereof through an angle α, wherein the respective front end is arranged with a shorter spacing than the rear end with respect to the longitudinal axis of symmetry so that the respective rear, upper substantially horizontally extending support carrier extends from the inner side to the outer side. The angle α is advantageously α=5°±2°.

The respective rear, curved support carrier preferably extends in a vertical plane from the respective front end thereof, which is arranged on the respective suspension strut receiving member, up to the rear end thereof, which is arranged on a lateral longitudinal carrier, through a predetermined angle α, wherein the respective front end of the respective rear, curved support carrier is arranged with a shorter spacing with respect to the longitudinal axis of symmetry than the rear end so that the respective rear, curved support carrier extends from the interior outwardly.

Advantageously, there are constructed at the respective front end of the respective front support carrier of the respective wheel house carrier structure in a substantially horizontal plane two flanges which are spaced apart from each other and in a plane x-z perpendicular thereto two flanges which are spaced apart from each other and which are secured in each case to an opposing surface of the respective motor carrier. As a result of the increased rigidity of the front carriage structure, an improvement of the travel dynamics is possible.

In an advantageous embodiment, below the respective securing location of the respective front end of the respective front support carrier, a bearing is arranged on the respective motor carrier. A front axle carrier is secured to the respective bearing.

A respective rear end of the respective front support carrier is advantageously secured to a suspension strut receiving member.

In an advantageous embodiment, a respective lower end of a central support carrier is secured to the respective motor carrier with spacing from the respective front end of the respective front support carrier. A respective upper end of the central support carrier is secured to the respective suspension strut receiving member.

Advantageously, a respective lower end of the respective central support carrier is secured in each case at least to a perpendicular face of the respective motor carrier at a respective securing location. Below the respective securing location of the respective central support carrier, a bearing is arranged on the respective motor carrier. The front axle carrier is secured to the respective bearing.

In an advantageous embodiment, a rear, curved support carrier and a rear, horizontally extending support carrier are arranged between the respective suspension strut receiving member and the respective front body pillar, respectively.

A front end of the respective rear, curved support carrier is advantageously arranged on the respective suspension strut receiving member. A respective rear end of the respective rear, curved support carrier is secured to a respective lower portion of the front body pillar.

In an advantageous embodiment, the respective front end of the respective rear, horizontally extending support carrier is arranged on the respective suspension strut receiving member. The respective rear end of the respective rear, horizontally extending support carrier is secured to the respective lower portion of the respective front body pillar.

The transition between the respective front end of the rear, curved support carrier and the respective rear, horizontally extending support carrier which is connected thereto advantageously extends at the height of the respective suspension strut receiving member in the direction toward the respective rear end of the respective front support carrier in a curved or rounded manner.

The front axle carrier is secured in an advantageous embodiment at both sides to a transverse carrier by means of a third bearing in each case. The respective transverse carrier is arranged on a front wall of the passenger compartment, on the respective motor carrier and on the respective front body pillar.

Advantageously, the securing of the respective flanges of the support carriers to the respective motor carrier is carried out by means of a materially engaging attachment, such as a weld connection.

In an advantageous embodiment, a deformation element is arranged in each case in front of the respective front end of the respective front support carrier.

A spacing between the respective front end of the respective front support carrier and the respective front end of the respective motor carrier is advantageously between 5 cm and 12 cm.

An embodiment of the invention is described below by way of example with reference to the drawings.

DETAILED DESCRIPTION OF THE DRAWINGS

Figure 1:
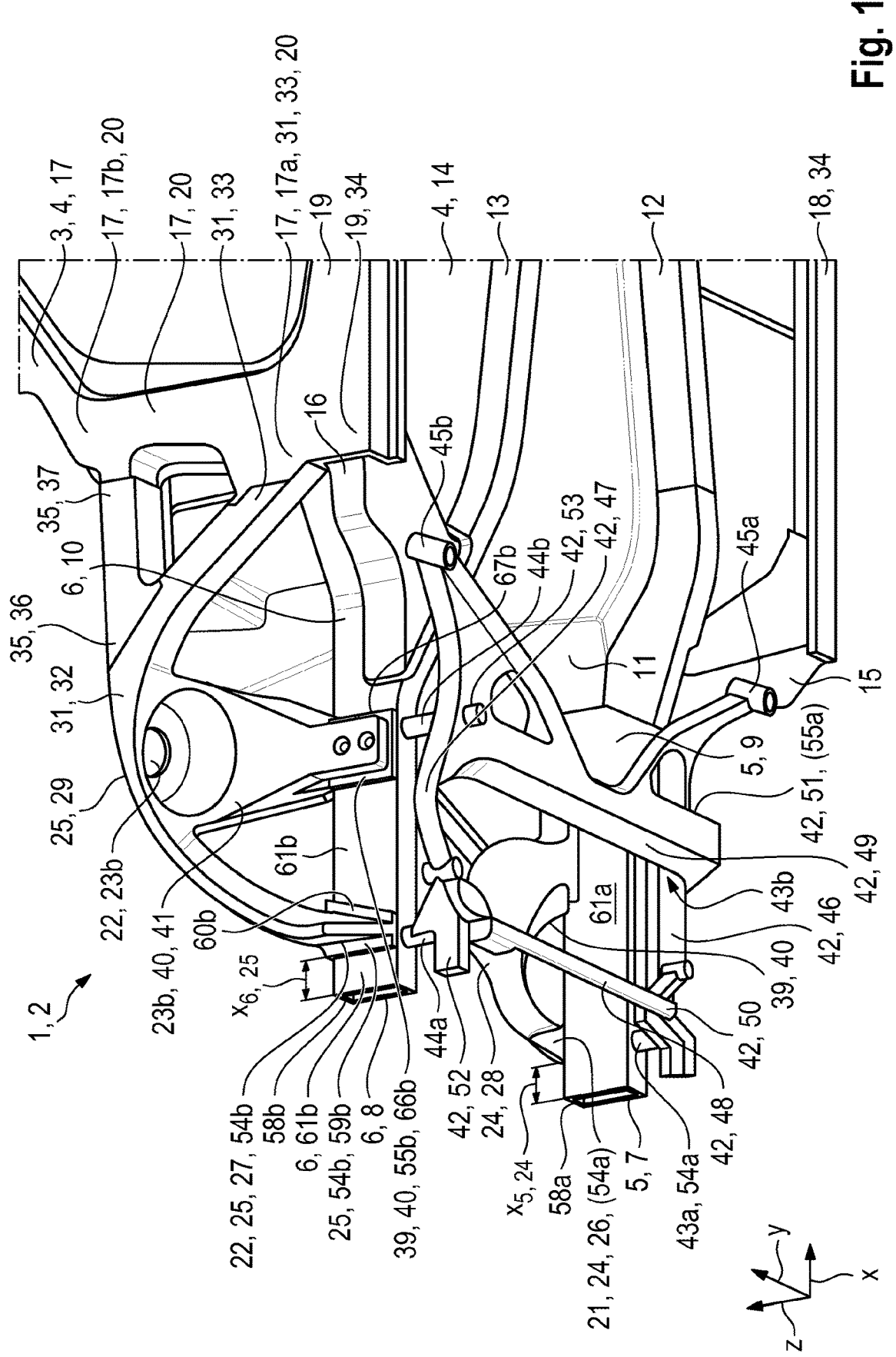
FIG. 1 is a perspective view of a front carriage structure, obliquely from below, so that a front axle carrier, the two motor carriers, the two wheel house carrier structures and portions of a passenger compartment can be seen.

FIG. 1 is a perspective view of a front carriage structure 2 of a motor vehicle 1. The front carriage structure 2 is adjoined by a body 3 which forms a passenger compartment 4. In FIG. 1, two motor carriers 5 and 6 which are spaced apart from each other and which extend parallel with each other are illustrated. In one embodiment, a deformation element which is not illustrated and which is known per se adjoins a respective front end 7, 8 of the respective motor carrier 5, 6.

A respective rear end 9, 10 of the respective motor carrier 5, 6 is arranged on a front wall 11 of the passenger compartment 4. A force path which is produced by the motor carrier 5, 6 in the event of a vehicle impact is transmitted via a longitudinal carrier 12, 13 in each case. The longitudinal carriers 12, 13 are arranged on a floor 14 of the passenger compartment 4.

Furthermore, the force path which flows through the respective motor carrier 5, 6 is transmitted via obliquely extending (transverse) carriers 15, 16 to a front body pillar or A-pillar 17 in each case and to a lateral longitudinal carrier or sill panel 18, 19 which are constructed at both sides of the body 3.

FIG. 1 shows a lower portion 20 of the A-pillar 17 which serves to connect a door which is not illustrated. At both sides of the front carriage structure 2, a wheel house carrier structure 21, 22 is secured to the respective motor carrier 5, 6 and to the respective lower portion 20 of the respective A-pillar 17.

The respective wheel house carrier structure 21, 22 further has a suspension strut receiving member (23a,) 23b in each case. The respective wheel house carrier structure 21, 22 surrounds in each case a wheel house which is not illustrated for the respective arrangement of a wheel which is not illustrated.

The respective wheel house carrier structure 21, 22 has a front support carrier 24 and 25. A respective front end 26, 27 of the respective front support carrier 24, 25 is spaced apart at a predetermined spacing $x_{5, 24}$; $x_{6, 25}$ from the respective front end 7, 8 of the respective motor carrier 5, 6.

Figure 2:
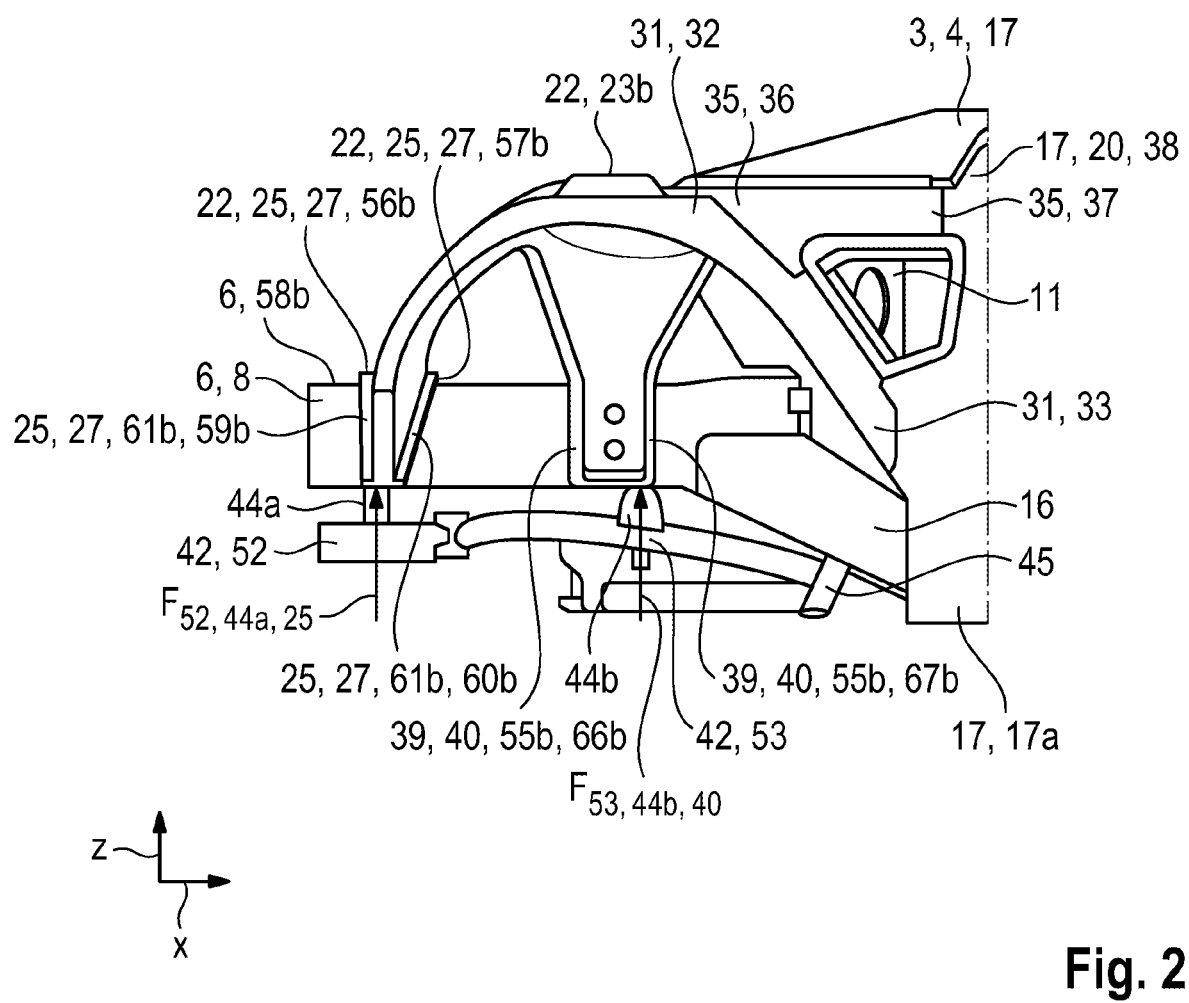
FIG. 2 is a side view according to FIG. 1, in which a suspension strut receiving member, a front support carrier, a central support carrier, a rear, upper support carrier, a rear, lower support carrier, a motor carrier, a partially illustrated front axle carrier and a front body pillar are shown.
Figure 4:
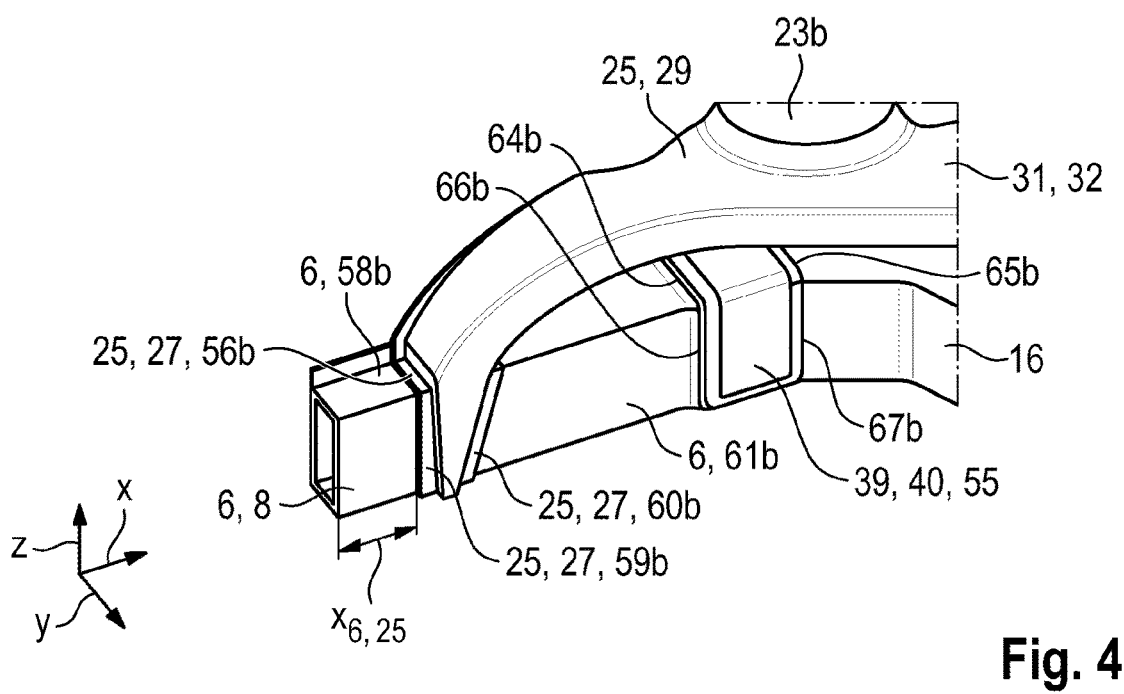
FIG. 4 is a perspective illustration in which a front end of the front support carrier is secured to a front end of the motor carrier in two planes.

A respective rear end 28, 29 of the respective front support carrier 24, 25 is arranged on the respective suspension strut receiving member (23a,) 23b. As can be seen in FIGS. 1, 2 and 4, the respective front support carrier 24, 25 has an arched or curved path. The respective front support carrier 24, 25 is adjoined in each case by a rear, lower curved support carrier 30, 31 with the respective front end 32 thereof.

A respective rear end 33 of the respective rear, curved support carrier 30, 31 is secured at a lower end 17a of the A-pillar 17 above a respective front end 34 of the respective lateral longitudinal carrier 18, 19.

The respective front end 32 of the respective rear, curved support carrier 30, 31 is adjoined by a substantially horizontally extending rear, upper, substantially horizontally extending support carrier 35 with the front end 36 thereof. A respective rear end 37 of the respective rear, horizontally extending support carrier 35 is secured to an upper end 17b of the lower portion 20 of the A-pillar 17.

The respective rear, lower curved support carrier 30, 31 and the respective rear, upper, horizontally extending support carrier 35 are, in a side view, that is to say, in the vertical plane x, z, arranged in a V-shaped or Y-shaped manner with respect to each other.

A respective lower end 39 of a substantially perpendicularly extending central support carrier 40 is secured to the respective motor carrier 5, 6 with spacing from the respective front end 26, 27 of the respective front support carrier 24, 25. A respective upper end 41 of the central support carrier 40 is secured to the respective suspension strut receiving member 23.

Below the respective motor carrier 5, 6, a front axle carrier or auxiliary frame 42 is connected by means of two bearings 43a, 43b and 44a, 44b to the respective motor carrier 5, 6.

Figure 3:
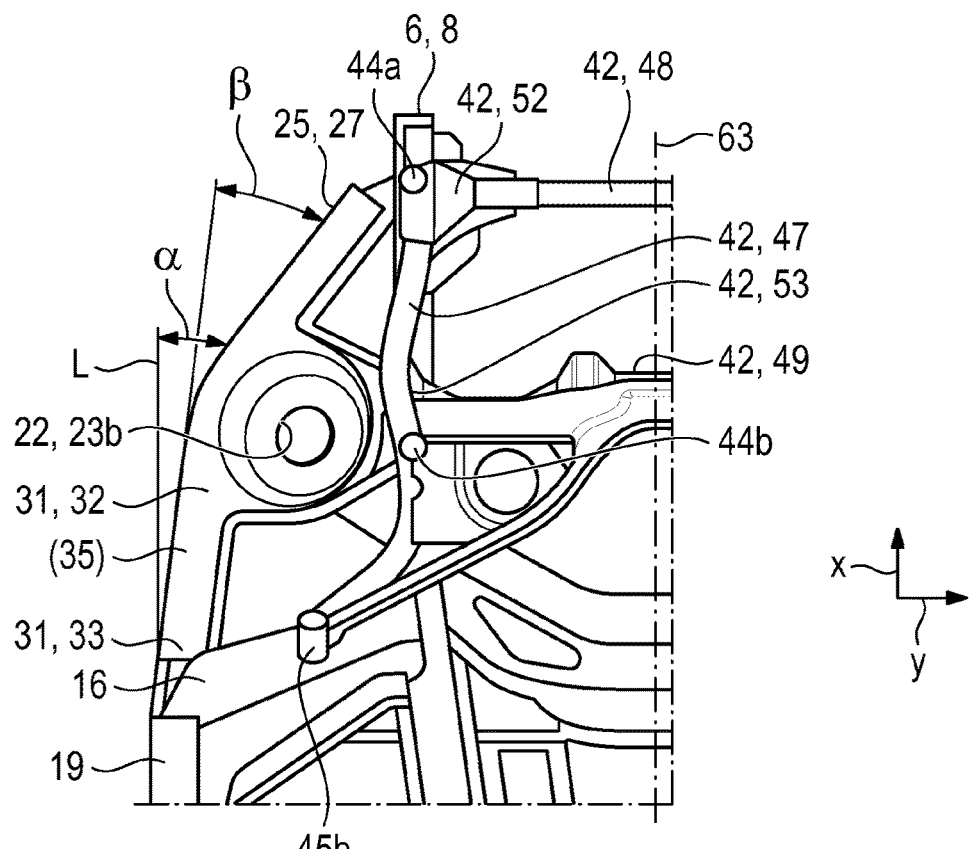
FIG. 3 is a view from below, which shows the right motor carrier, the front support carrier which is arranged on the motor carrier, the suspension strut receiving member, an upper, rear support carrier which is arranged on the suspension strut receiving member and the arrangement of the right half of the front axle carrier on the motor carrier and a transverse carrier via three bearings.

In the embodiment shown, the front axle carrier 42 has two longitudinal portions 46 and 47 which are spaced apart from each other and which extend symmetrically relative to a vehicle longitudinal axis x or longitudinal axis of symmetry 63 (FIG. 3). In the embodiment shown, the two longitudinal portions 46, 47 of the front axle carrier 42 are connected to each other by means of two transverse portions 48 and 49.

At the connection locations or connection nodes 50, 51 or 52, 53 between the longitudinal portions 46, 47 and the transverse portions 48, 49 of the front axle carrier 42, bearings 43a, (43b) and 44a and 44b are arranged.

The front axle carrier 42 is secured at both sides by means of a third bearing 45a, 45b to the respective (transverse) carrier 15, 16. The respective (transverse) carrier 15, 16 is secured to the front wall 11 of the passenger compartment 4, to a respective outer perpendicular surface 61a, 61b of the respective motor carrier 5, 6 and to the respective front body pillar 17.

In the embodiment shown, the connection nodes 50, 52 of the front axle carrier 42 are located on the respective motor carrier 5, 6 with respect to a respective securing location (54a), 54b of the respective front end 26, 27 of the respective front support carrier 24, 25.

In the embodiment shown, the connection nodes 52, 53 of the front axle carrier 42 are located on the respective motor carrier 5, 6 with respect to a respective securing location (55a), 55b of the respective lower end 39 of the respective central support carrier 40.

The respective lower end 39 of the central support carrier 40 has at the respective securing location 55a, 55b on the respective perpendicular face 61a, 61b of the respective motor carrier 5, 6 opposing flanges 66(a,b) and 67(a,b) which are spaced apart by the width of the respective lower end 39 of the central support carrier 40.

Furthermore, there is also a securing illustrated in FIG. 4 of the respective lower end 39 of the respective central support carrier 40 by means of spaced-apart flanges 64(a,b) and 65(a,b) to the respective horizontal face (58a,)58b of the respective motor carrier 5, 6.

The respective front end 26, 27 of the respective front support carrier 24, 25 has at the respective securing locations 54a and 54b in a horizontal plane x-y when viewed in the longitudinal vehicle direction x, flanges 56(b) and 57(b) (FIG. 2) which are spaced apart from each other and which are secured to a respective opposing horizontal face 58(b) of the respective motor carrier 5, 6.

In the perpendicular plane z-x of the respective motor carrier 5, 6 facing away from the longitudinal axis of symmetry 63 additional opposing and mutually spaced apart flanges 59(b) and 60(b) of the respective front support carrier 24, 25 are secured to the corresponding surface 61(b) of the respective motor carrier 5, 6.

As a result of this arrangement, forces $F_{52, 44a, 25}$ and $F_{53, 44b, 40}$ (see corresponding arrows in FIG. 2) which originate from the front axle carrier 42 via the bearings 43a and 43b and 44a and 44b can be introduced into the motor carriers 5, 6 and consequently into the front support carriers 24, 25 and into the central support carriers 40 which are spaced apart therefrom.

The forces $F_{52, 44a, 25}$ and $F_{53, 44b, 40}$ are then transmitted via the suspension strut receiving member 23 into the rear, horizontally extending support carrier 35 and into the rear curved support carrier 31 and then into the lower portion 20 of the A-pillar 17.

As can be seen from the plan view from below in FIG. 3, the rear, curved support carrier 31 and the rear, horizontally extending support carrier 35 extend at the right vehicle side in the horizontal plane x-y at an angle α.

In the embodiment shown, the angle α is between a line L in the longitudinal vehicle direction x and the outer contour of the support carriers 31 and 35 in the direction of the longitudinal axis of symmetry 63. In the embodiment shown, the angle α is approximately α=5°±2°.

The front support carrier 25 which adjoins the support carriers 31 and 35 shown in FIG. 3 runs with respect to the outer contour of the rear support carriers 31, 35 in addition to the angle α through an angle ß inwardly in the direction of the longitudinal axis of symmetry 63. In the embodiment shown, the angle ß is ß=35°±5°.

In the embodiment shown, the angles α and B result from the peripheral vehicle conditions. The angle α is dependent on the vehicle width and the position of the two suspension strut receiving members 23. The angle ß results from the position of the two suspension strut receiving members 23 and the motor carrier gauge, that is to say, the spacing in the horizontal plane x-y between the two motor carriers 5 and 6.

As a result of the arrangement of the respective rear support carriers 30, 31 and 35 with respect to the respective front support carriers 24, 25 in the embodiment shown in FIG. 3, there is produced at the height of the respective suspension strut receiving member 23 a stepless, curved or rounded path from the respective A-pillar 17, via the respective rear support carriers 30, 31 and 35, the two suspension strut receiving members 23 and the respective front support carriers 24, 25 as far as the respective motor carrier 5, 6.

As a result of the securing of the respective front end 26, 27 of the respective front support carrier 24, 25 by means of two flange portions 56, 57; 59, 60 which are located in different planes, a torque-rigid connection of the respective front end 26, 27 of the respective front support carrier 24, 25 to the respective motor carrier 5, 6 is produced.

The securing of the respective flanges 56, 57 and 59, 60 of the respective front support carrier 24, 25 and the flanges 66, 67 of the respective central support carrier 40 to the respective motor carrier 5, 6 may, for example, be a weld connection. The weld connection may be carried out by means of a series of welding points and/or by means of a linear welding.

In an advantageous embodiment, the spacing $x_{5, 24}$; $x_{6;25}$ from the respective front end 26, 27 of the respective front support carrier 24, 25 to the respective front end 7, 8 of the respective motor carrier 5, 6 is in a range from 5 cm≤$x_{5,24}$; $x_{6;25}$≤12 cm.

The path of the respective front support carrier 24, 25 from the respective front end 26, 27 thereof up to the respective rear end 28, 29 on the suspension strut receiving member 23 merges in a stepless manner into the respective front end 32 of the respective rear, curved support carrier 30, 31 and into the respective front end 36 of the respective rear, horizontally extending support carrier 35.

What is claimed is:

1. A motor vehicle, comprising:
a front carriage structure comprising a wheel house carrier structure at both lateral sides of the vehicle;
motor carriers, wherein a respective wheel house carrier structure is connected to a respective motor carrier;
front body pillars, wherein a respective wheel house carrier structure is connected to a respective front body pillar,
wherein
each respective wheel house carrier structure comprises a front support carrier, a suspension strut receiving member, a rear curved support carrier which extends obliquely downward, and a rear, upper substantially horizontally extending support carrier which are, in each case, secured to the respective front body pillar,
the respective front support carrier extends in a vertical plane in a curve downward from the respective suspension strut receiving member in the direction toward the respective motor carrier,
the respective front support carrier extends in a horizontal plane in a curve from the respective suspension strut receiving member from an outer side inward in the direction of a longitudinal axis of symmetry through an angle ß in the direction toward the respective motor carrier, and
the respective front support carrier is secured to the respective motor carrier with the respective front end thereof,
wherein, below a respective securing location of the respective front end of the respective front support carrier, a bearing is arranged on the respective motor carrier, and a front axle carrier is secured to the respective bearing.

2. The motor vehicle according to claim 1, wherein
the respective rear, upper substantially horizontally extending support carrier extends in a horizontal plane from the front end thereof up to the rear end thereof through an angle $\alpha$,
the respective front end is arranged with a shorter spacing than the rear end with respect to the longitudinal axis of symmetry so that the respective rear, upper substantially horizontally extending support carrier extends from the inner side to the outer side.

3. The motor vehicle according to claim 1, wherein
the respective rear, curved support carrier extends in a vertical plane from the respective front end thereof, which is arranged on the respective suspension strut receiving member, up to the rear end thereof, which is arranged on a lateral longitudinal carrier, through a predetermined angle $\alpha$,
the respective front end of the respective rear, curved support carrier is arranged with a shorter spacing with respect to the longitudinal axis of symmetry than the rear end so that the respective rear, curved support carrier extends from the inner side to the outer side.

4. The motor vehicle according to claim 1, wherein
the respective front end of the respective front support carrier of the respective wheel house carrier structure has, in a substantially horizontal plane, two flanges which are spaced apart from each other and, in a plane x-z perpendicular thereto, two flanges which are spaced apart from each other and which are secured in each case to an opposing horizontal surface of the respective motor carrier.

5. The motor vehicle according to claim 1, wherein
a respective rear end of the respective front support carrier is secured to a suspension strut receiving member.

6. The motor vehicle according to claim 1, wherein
a respective lower end of a central support carrier is secured to the respective motor carrier with spacing from the respective front end of the respective front support carrier, and
a respective upper end of the central support carrier is secured to the respective suspension strut receiving member.

7. The motor vehicle according to claim 6, wherein
the respective lower end of the respective central support carrier is secured in each case at least to a perpendicular face of the respective motor carrier at a respective securing location, wherein, below the respective securing location of the respective central support carrier, a second bearing is arranged on the respective motor carrier and wherein the front axle carrier is secured to the respective second bearing.

8. The motor vehicle according to claim 1, wherein
the curved support carrier and the rear, horizontally extending support carrier are arranged between the respective suspension strut receiving member and the respective front body pillar, respectively.

9. The motor vehicle according to claim 1, wherein
a front end of the respective rear, curved support carrier is arranged on the respective suspension strut receiving member, and
a respective rear end of the respective rear, curved support carrier is secured to a respective lower portion of the front body pillar.

10. The motor vehicle according to claim 9, wherein
a respective front end of the respective rear, horizontally extending support carrier is arranged on the respective suspension strut receiving member, and
a respective rear end of the respective rear, horizontally extending support carrier is secured in each case to an upper end of the respective lower portion of the respective front body pillar.

11. The motor vehicle according to claim 10, wherein
a transition between the respective front end of the rear, curved support carrier and the respective connected front end of the rear, horizontally extending support carrier extends at a height of the respective suspension strut receiving member in the direction toward the respective rear end of the respective front support carrier in a curved or rounded manner.

12. The motor vehicle according to claim 7, wherein
the front axle carrier is secured at both sides to a transverse carrier by way of a third bearing in each case, and
the respective transverse carrier is secured to a front wall of the passenger compartment, to the respective motor carrier and to the respective front body pillar.

13. The motor vehicle according to claim 4, wherein
the securing of the respective flanges of the support carriers to the respective motor carrier is carried out by a materially engaging attachment.

14. The motor vehicle according to claim 1, wherein
a deformation element is arranged in each case at the front end of the respective front support carrier.

* * * * *